(12) United States Patent
Watanabe et al.

(10) Patent No.: US 8,334,794 B2
(45) Date of Patent: Dec. 18, 2012

(54) INPUT DEVICE AND KEYBOARD DEVICE HAVING ILLUMINATION FUNCTION

(75) Inventors: Kazutoshi Watanabe, Fukushima-ken (JP); Hideaki Nagakubo, Fukushima-ken (JP); Takenobu Kimura, Fukushima-ken (JP); Koichi Yamamoto, Fukushima-ken (JP); Katsuyuki Katayama, Fukushima-ken (JP); Naomi Sato, Fukushima-ken (JP); Naoya Akiyama, Fukushima-ken (JP); Shinichiro Kimura, Fukushima-ken (JP); Masahiro Ishida, Fukushima-ken (JP); Naoki Yamada, Fukushima-ken (JP); Keiji Takagi, Fukushima-ken (JP); Toshinobu Hosaka, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 560 days.

(21) Appl. No.: 12/579,903

(22) Filed: Oct. 15, 2009

(65) Prior Publication Data

US 2010/0097246 A1   Apr. 22, 2010

(30) Foreign Application Priority Data

Oct. 16, 2008 (JP) ................................. 2008-267178
Mar. 19, 2009 (JP) ................................. 2009-067287
Mar. 19, 2009 (JP) ................................. 2009-067289

(51) Int. Cl.
*H03M 11/00* (2006.01)

(52) U.S. Cl. ........................................... 341/22; 341/20
(58) Field of Classification Search .................... 341/22; 400/489; 345/168, 169; 200/310–317
See application file for complete search history.

(56) References Cited

U.S. PATENT DOCUMENTS

| 6,284,988 B1 * | 9/2001 | Watanabe et al. ............. 200/5 A |
| 6,554,442 B2 | 4/2003 | Chou |
| 6,686,549 B2 | 2/2004 | Douzono et al. |
| 6,871,978 B2 * | 3/2005 | Chan et al. ....................... 362/85 |
| 7,939,773 B2 * | 5/2011 | Tsai .............................. 200/313 |
| 7,952,043 B2 * | 5/2011 | Lin ............................... 200/310 |

FOREIGN PATENT DOCUMENTS

| JP | U 3082585 | 12/2001 |
| JP | 2002-251937 | 6/2002 |

* cited by examiner

*Primary Examiner* — Brian Young
(74) *Attorney, Agent, or Firm* — Hunton & Williams LLP

(57) ABSTRACT

An input device includes a plurality of manipulation portions; an input function portion manipulated by the manipulation portions to perform an input function; a light guiding sheet facing the rear side of the plurality of manipulation portions; and a light source applying light into the light guiding sheet, wherein a rear surface opposite to a front surface of the light guiding sheet facing the manipulation portions is provided with a plurality of concave portions which is depressed to the inside of the light guiding sheet, wherein each concave portion has a circular opening and an inner surface which is a smooth concave curve surface, and wherein light propagated through the inside of the light guiding sheet is reflected by the inner surface toward the inside of the light guiding sheet, and the light is applied from the front surface of the light guiding sheet to the manipulation portions.

24 Claims, 8 Drawing Sheets

INPUT DEVICE AND KEYBOARD DEVICE HAVING ILLUMINATION FUNCTION

CROSS REFERENCE TO RELATED APPLICATION

The present invention claims the benefit of the following: Japanese Patent Application JP 2008-267178 filed in the Japanese Patent Office on Oct. 16, 2008; Japanese Patent Application JP 2009-067287 filed in the Japanese Patent Office on Mar. 19, 2009; and Japanese Patent Application JP 2009-067289 filed in the Japanese Patent Office on Mar. 19, 2009. The entire contents of each application is incorporated herein by reference.

BACKGROUND OF THE DISCLOSURE

1. Technical Field

The present invention relates to an input device which has an illumination function and a keyboard device in which contacts contact with each other by a plurality of key tops, and particularly, to a keyboard device having a function of illuminating a key top.

2. Related Art

Personal computers or various information searching apparatuses are equipped with a keyboard device in which a plurality of key tops are arranged.

In recent years, the keyboard device has been required to have an illumination function of allowing a user to recognize key tops in a dark place. Particularly, book-type or laptop-type personal computers have been required to be equipped with an input device and a keyboard device having an illumination function so as to visually recognize the key tops in a dark place.

In a keyboard device disclosed in Japanese Patent Application Laid-open No. 2002-251937, an electroluminescent element is disposed on the rear side of a base substrate supporting key tops, and light emitted from the electroluminescent element is applied to the key tops through perforation holes formed in the base substrate.

In a keyboard device disclosed in Japanese Registered Utility Model No. 3082585, a plate-shaped light emitting element including a cold-light plate or a cold-cathode plate is formed on a base, a circuit board and an elastic sheet are laminated on the light emitting element, and then a plurality of key tops is formed on the elastic sheet. Light emitted from the plate-shaped light emitting element is applied to the key tops through holes formed in the circuit board and the elastic sheet.

In the keyboard device disclosed in Japanese Patent Application Laid-open No. 2002-251937, the electroluminescent element is disposed on the rear side of the base substrate, and the light is applied to the key tops through the perforation holes opened to the base substrate. Further, in the keyboard device disclosed in Japanese Registered Utility Model No. 3082585, the light emitted from the plate-shape light emitting element is applied to the key tops through the holes formed in the circuit board and the elastic sheet.

Likewise, since the known keyboard devices have a structure in which the light emitted from the light source is applied to the key tops through the holes formed in other members located above the light source, the utilization efficiency of the light used for illuminating the key tops is not satisfactory. In addition, since the light is interrupted by the base substrate or the like interposed between the key top and the light source, it is difficult to uniformly illuminate the key tops.

Further, in the keyboard devices disclosed in Japanese Patent Application Laid-open No. 2002-251937 and Japanese Registered Utility Model No. 3082585, since the sheet-shaped light source is used, it is not possible to intensively apply the light to an illumination target position of the key top.

These and other drawbacks exist.

SUMMARY OF THE DISCLOSURE

The present invention solves the above-described problems, and an object of the invention is to provide an input device and a keyboard device having an illumination function capable of efficiently applying light emitted from a light source to a key top and clearly illuminating an illumination target position of the key top.

According to an exemplary embodiment, there is provided an input device including: a plurality of manipulation portions; an input function portion which is manipulated by the manipulation portions to perform an input function; a light guiding sheet which faces the rear side of the plurality of manipulation portions; and a light source which applies light to the inside of the light guiding sheet, wherein a rear surface opposite to a front surface of the light guiding sheet facing the manipulation portions is provided with a plurality of concave portions which is depressed to the inside of the light guiding sheet, wherein each concave portion has a circular opening and an inner surface which is a smooth concave curve surface, and wherein light propagated through the inside of the light guiding sheet is reflected by the inner surface toward the inside of the light guiding sheet, and the light is applied from the front surface of the light guiding sheet to the manipulation portions.

In an input device according to this embodiment, since the light is guided by the light guiding sheet disposed on the rear side of the manipulation portions so as to illuminate each of the manipulation portions, it is possible to decrease the number of light sources, and thus to manufacture the input device at a low cost. In addition, since the light emitting element is not disposed on the rear side of the manipulation portions, even when the manipulation portions are frequently manipulated by strong force, the durability of the light emitting function does not deteriorate.

In addition, since the rear surface of the light guiding sheet is provided with the concave portions each having the inner surface which is the concave curve surface, and the light propagated through the inside of the light guiding sheet is reflected by the inner surface as the curve surface to the inside of the light guiding sheet so as to be applied from the front surface of the light guiding sheet to the manipulation portions, it is possible to intensively apply the light to the illumination target position of the manipulation portion. Further, since the inner surface of the concave portion is the smooth surface, a diffused reflection of the light propagated through the inside of the light guiding sheet does not occur in the inner surface, thereby easily preventing the attenuation of the light. For this reason, it is possible to apply the light having high illuminance to the manipulation portion located at a position distant from the light source.

According to an exemplary embodiment, there is provided a keyboard device including: a chassis; a plurality of key tops; and support members which are formed on the chassis and support the key tops so as to be movable in the vertical direction, wherein a lower contact, a flexible pressing sheet covering the lower contact, and a contact input portion formed on a lower surface of the pressing sheet and having an upper contact facing the lower contact are disposed between the chassis and each key top, wherein a plurality of the contact input portions is disposed at positions pressed by the key tops, wherein the pressing sheet or a coating sheet laminated on the pressing sheet is a light guiding sheet which propagates light therein, wherein a light source is disposed on the chassis so as to apply light to the inside of the light guiding sheet, wherein a rear surface opposite to a front surface of the light guiding sheet facing the key tops is provided with a plurality of concave portions, and wherein light propagated through the inside of the light guiding sheet is reflected by the concave portions toward the key tops.

In a keyboard device according to this embodiment, the pressing sheet forming the contact input portions or a coating sheet laminated thereon is the light guiding sheet, and a wide portion of the front surface of the light guiding sheet faces the key tops. For this reason, most of the light emitted from the front surface of the light guiding sheet is not interrupted and is applied to the key tops, thereby efficiently illuminating the key tops.

In addition, since the light guiding sheet is disposed at the uppermost portion of the contact input portion, it is not necessary to form the sheet, the contact, or the like located below the light guiding sheet to be transparent. Since it is not necessary to form a portion below the light guiding sheet to be transparent, it is possible to decrease a cost of a material.

Further, since the rear surface of the light guiding sheet is provided with the concave portions, and the light propagated through the inside of the light guiding sheet is reflected by the inner surfaces of the concave portions so as to be applied from the front surface of the light guiding sheet to the key tops, it is possible to intensively apply the light to an illumination target position of the key top.

For example, in a keyboard device according to this embodiment, the lower contact may be formed on a front surface of a substrate sheet, the substrate sheet may be fixed to the pressing sheet with an adhesive layer interposed therebetween except for a region where the lower contact faces the upper contact. The adhesive layer may be formed to have a thickness which allows the lower and upper contacts to face each other with a gap interposed therebetween.

In the above-described structure, since it is possible to form the contact input portion to be thin, it is possible to realize the thin keyboard device.

Each concave portion according to this embodiment has a circular, oval, or elliptical opening and an inner surface which is a smooth concave curve surface.

Since the inner surface of the concave portion formed in the light guiding sheet is the smooth surface, a diffused reflection of the light propagated through the inside of the light guiding sheet does not occur in the inner surface, and the light is reflected toward the key top in the state where the directivity of the light is maintained. For this reason, it is possible to easily prevent the attenuation of the light and to apply the light having high illuminance to the key top located at a position distant from the light source.

It is also possible to prevent a difference in illumination luminance in accordance with a distance from the light source by appropriately changing the size or shape of the concave portion.

For example, a depth of the concave portion and an inclined angle of the inner surface with respect to the rear surface are set to be different depending on a location of the light guiding sheet. In this case, the depth and the angle may increase in a direction away from the light source.

Further, the concave portions having different depths and angles may exist in a region where light is applied to the same key top.

By using the concave portions having different depths and angles, it is possible to optimally illuminate the illumination target position of the key top in accordance with the location, shape, and width of the illumination target position.

Further, an area of the opening of the concave portion may be different depending on a location of the light guiding sheet.

Furthermore, arrangement density of the plurality of concave portions may be different depending on a location of the light guiding sheet. In this case, the arrangement density of the concave portions facing the key top distant from the light source may be higher than that of the concave portions facing the key top adjacent to the light source.

In this embodiment, the concave portion formed in the light guiding sheet is formed by decomposing a part of a synthetic resin material, forming the light guiding sheet, using energy of a laser.

In a keyboard device according to this embodiment, the light source may be disposed between the adjacent support members supporting the key tops, and the light guiding sheet may be provided with a hole for allowing the light source to be inserted therein.

Since the light source is disposed between the adjacent support members, it is possible to decrease a distance from the light source to each key top, and thus to improve the utilization efficiency of the light.

According to various embodiments, there is provided a keyboard device including: a chassis; a plurality of key tops; support members which are formed on the chassis and support the key tops so as to be movable in the vertical direction; contact input portions which receive pressing force from the key tops so that facing contacts contact with each other; a light source; a light guiding sheet which applies light emitted from the light source to the key tops; and a mask member which is formed above the chassis and below the key tops so as to cover a gap between the adjacent key tops from the chassis.

In a keyboard device according to these embodiments, since the mask member is disposed between the chassis and the key tops, it is possible to easily prevent the light from leaking between the adjacent key tops.

In a keyboard device according to these embodiments, the mask member may include a shielding portion in which a shielding film is formed on a flexible and translucent base sheet and a translucent portion in which the shielding film is not formed. The shielding portion may be disposed at a position covering the gap between the adjacent key tops from the downside of the gap. The contact input portions may be covered by the base sheet, and the pressing force of the key tops may be applied to the contact input portions through the base sheet.

As described above, if the mask member is formed by the flexible sheet, even when a notch is not formed in a position pressing the contact input portion, the base sheet is deformed by the pressing force applied from the key top, and hence the contact input portion is pressed. Accordingly, it is not necessary to form a plurality of window portions, used to press the contact input portion, by cutting, and thus to easily handle the mask member.

In this embodiments, the translucent portion of the mask member may be formed at a position facing the lower side of each of the plurality of key tops, and an edge of the translucent portion may be located on the inside of an edge of each key top.

Since the area of the translucent portion formed in the mask member is set to be smaller than that of the key top, it is difficult for the light passing through the translucent portion to be diffused to the gap between the adjacent key tops.

Also, the light guiding sheet may be disposed above the chassis and below the mask member, and a portion of the light guiding sheet facing the translucent portion may be provided with a reflection region which reflects light toward the key tops.

Since the light guiding sheet is disposed above the chassis, the light reflected by the reflection region of the light guiding sheet is not shielded by the chassis or the like, and the light is applied to the key tops. Accordingly, it is possible to improve the utilization efficiency of the light. In addition, since the light guiding sheet is covered by the mask member, the light hardly leaks to the gap between the adjacent key tops.

According to an exemplary embodiment, it is possible to realize the input device having the illumination function and formed to have a thin frame by disposing the thin light guiding sheet on the rear side of the plurality of input portions. In addition, since it is not necessary to provide alight emitting element facing each manipulation portion, it is possible to decrease the cost. Also, even when the manipulation portion is frequently manipulated, the durability of the illumination function does not deteriorate.

Further, it is possible to intensively apply the light to the illumination target position of the manipulation portion. Also, since the manipulation portion is hardly influenced by a variation in the distance from the light source, it is possible to decrease a difference in brightness of the illuminated manipulation portions. In addition, since the attenuation of the light hardly occurs due to the diffused reflection of the light propagated through the inside of the light guiding sheet, it is possible to apply the light having high illuminance from the light source to the manipulation portions.

Furthermore, according to an exemplary embodiments, it is possible to improve the utilization efficiency of the light used to illuminate the key tops of the keyboard device. In addition, it is possible to intensively apply the light to the illumination target position of the key top. Also, since the key top is hardly influenced by a variation in the distance from the light source, it is possible to decrease a difference in brightness of the illuminated key tops. In addition, since the attenuation of the light hardly occurs due to the diffused reflection of the light propagated through the inside of the light guiding sheet, it is possible to apply the light having high illuminance from the light source to the key tops.

DESCRIPTION OF EXEMPLARY EMBODIMENTS

The following description is intended to convey a thorough understanding of the embodiments described by providing a number of specific embodiments and details involving input and keyboard devices having illumination portions. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs. A keyboard device 1 according to a first embodiment shown in FIGS. 1 to 4 is mounted to a book-type, laptop-type, or desktop-type personal computer.

Figure 1:
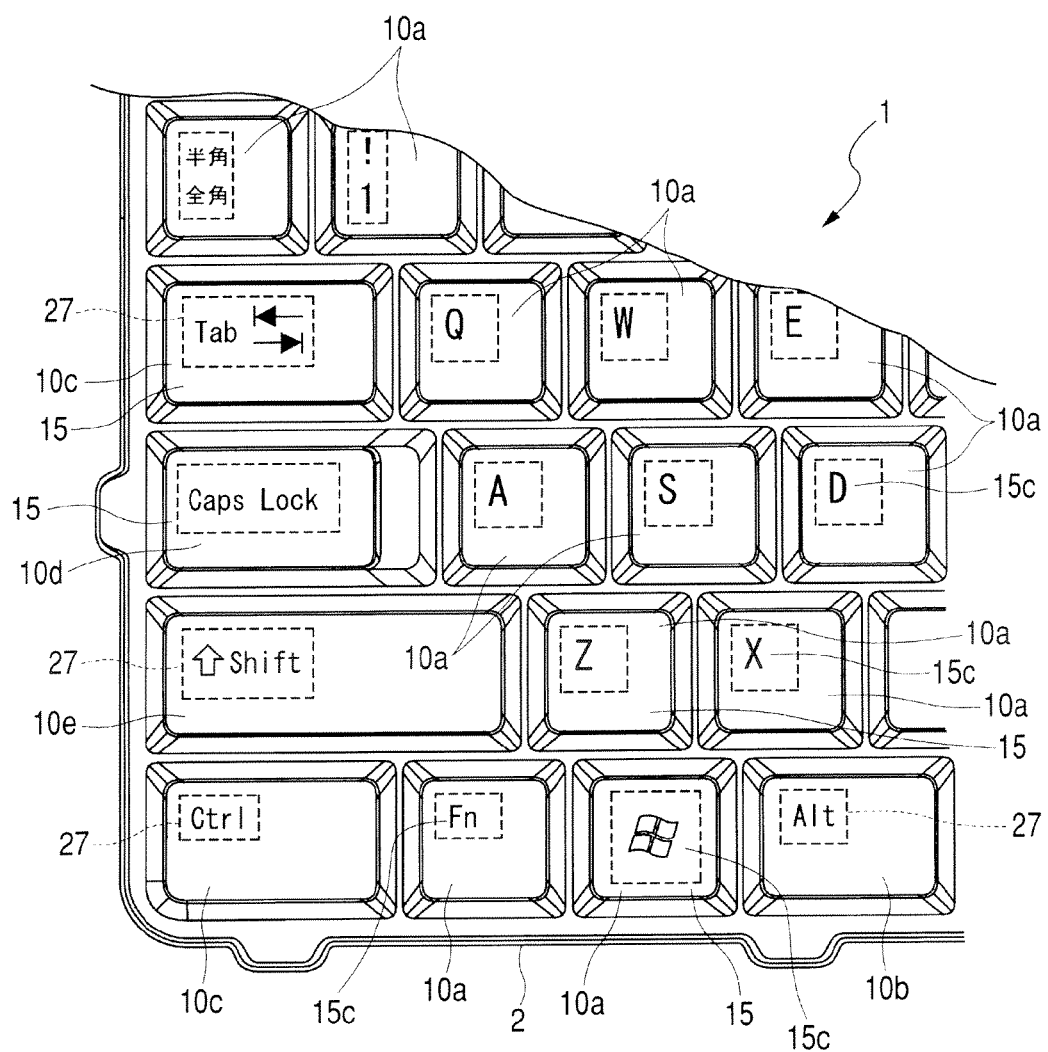
FIG. 1 is a partial plan view showing a part of a keyboard device according to a embodiment of the disclosure.

The keyboard device 1 may include a metallic chassis 2, where plural key input portions 10a, 10b, 10c, 10d, and 10e may be arranged on the chassis 2 in the longitudinal direction and the transverse direction. As shown in FIG. 1, the key input portions 10a, 10b, 10c, 10d, and 10e may be separated according to sizes of key tops 15 respectively formed in the key input portions. In addition, in the following description, the key tops having different sizes are denoted by the same reference numeral 15.

Figure 2:
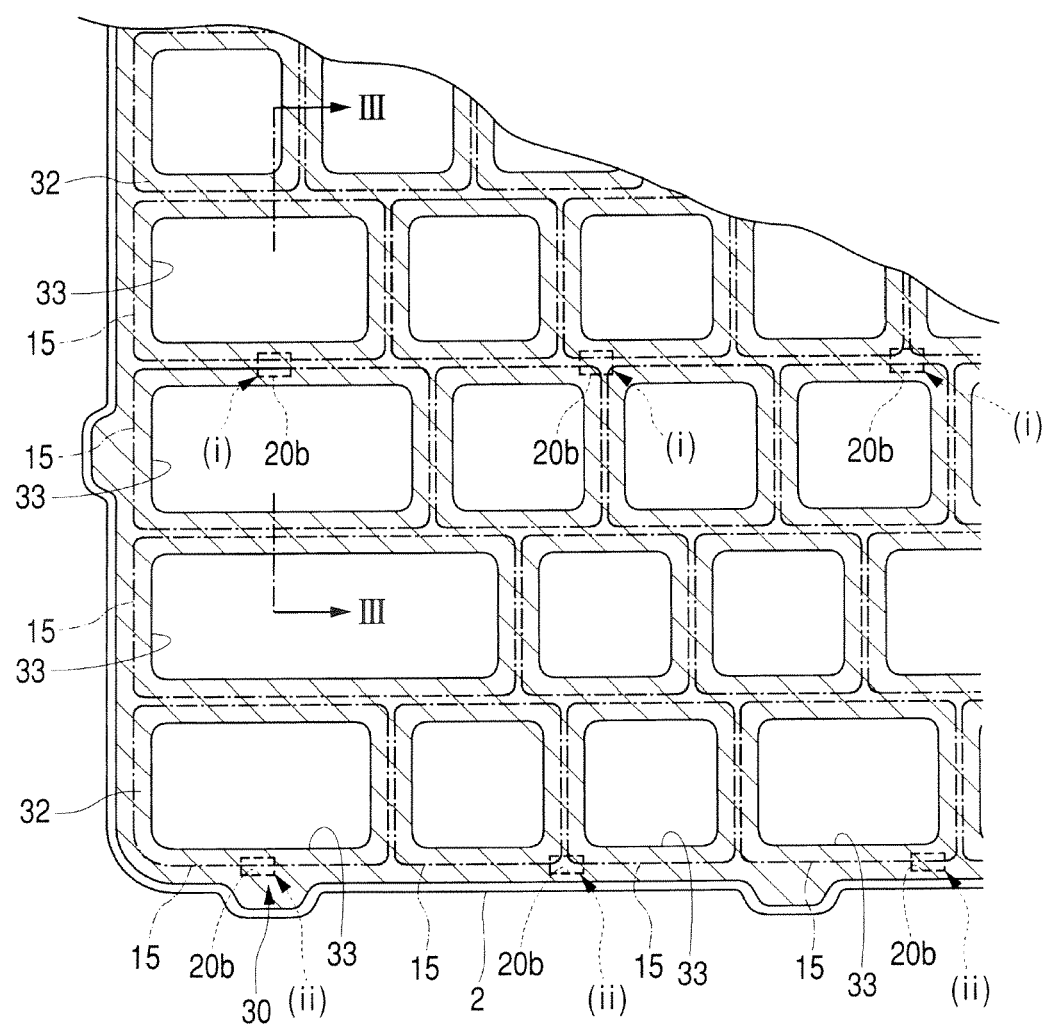
FIG. 2 is a partial plan view showing a state where key tops are removed from the keyboard device shown in FIG. 1.
Figure 3:
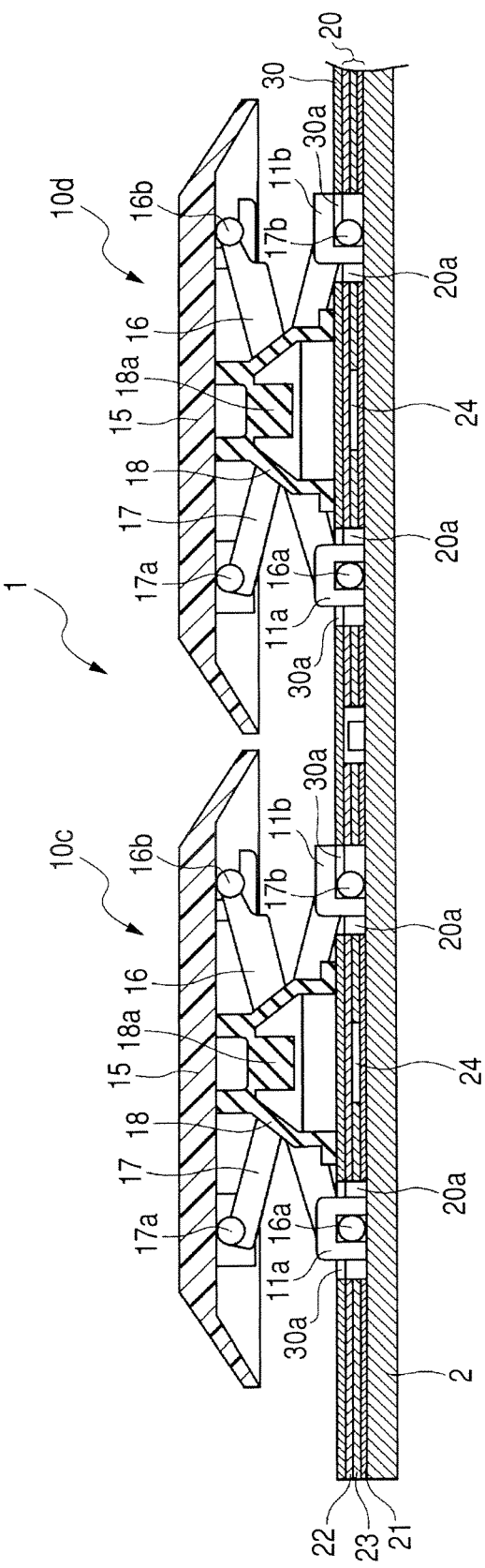
FIG. 3 is a sectional view showing the keyboard device and corresponding to a section taken along the line III-III in FIG. 2.

FIG. 3 is a sectional view showing a section of the keyboard device 1 taken along the line III-III in FIG. 2, where the key input portions 10c and 10d are shown. The lengths of the other key input portions 10a, 10b, and 10e may be different from the lengths of the key input portions 10c and 10d in the transverse direction in the key top 15, but the other structures may be substantially the same as those of the key input portions 10c and 10d.

As shown in FIG. 3, a membrane lamination body 20 and a mask sheet 30 may be sequentially laminated on the chassis 2 in an overlapping manner, and the key top 15 may be formed at an upper position distant from the chassis 2. In addition, in FIG. 4, the chassis 2, the membrane lamination body 20, and the mask sheet 30 are depicted so as to be distant from each other in the vertical direction, but in fact, a substrate sheet 21 of the membrane lamination body 20 may be adhered and fixed onto the chassis 2 and the mask sheet 30 may be adhered and fixed to a pressing sheet 22.

In the portions provided with the key input portions 10c and 10d, a first support piece 11a and a second support piece 11b of the chassis 2 may be bent upward. In the portions provided with the key input portions 10c and 10d, a pair of the first support pieces 11a may be formed so as to be distant from each other in a direction perpendicular to a paper sheet of FIG. 3, and a pair of the second support pieces 11b may be formed so as to be distant from each other in a direction perpendicular to the paper sheet. A hole 20a may be opened to the membrane lamination body 20, and a hole 30a may be opened to the mask sheet 30 so as to be connected to the hole 20a in the vertical direction. The first and second support pieces 11a and 11b may protrude from the membrane lamination body 20 through the holes 20a and 30a.

A first movable support member 16 and a second movable support member 17 may be formed between each key top 15 and the chassis 2. In the first movable support member 16, one end 16a may be supported to the first support piece 11a so as to be rotatable, and the other end 16b may be supported to the lower portion of the key top 15 so as to be rotatable and slidable in the transverse direction. In the second movable support member 17, one end 17a may be supported to the lower portion of the key top 15 so as to be rotatable, and the other end 17b may be supported to the second support piece 11b so as to be rotatable and slidable in the transverse direction. The center portions of the first movable support member 16 and the second movable support member 17 may be connected to each other so as to be rotatable, and hence the first movable support member 16 and the second movable support member 17 may constitute an X-shaped support link. In this embodiment, the X-shaped support link may be a support member which may support the key top 15 so as to be elevatable.

An elastic member 18 may be formed between the mask sheet 30 and the key top 15. The elastic member 18 may be formed of synthetic rubber, and may be an urging member which applies upward urging force to the key top 15 in a direction moving away from the chassis 2. The inside of the lower portion of the elastic member 18 may be a cavity, and a downward pressing convex portion 18a may be integrally formed with the cavity.

Figure 4:
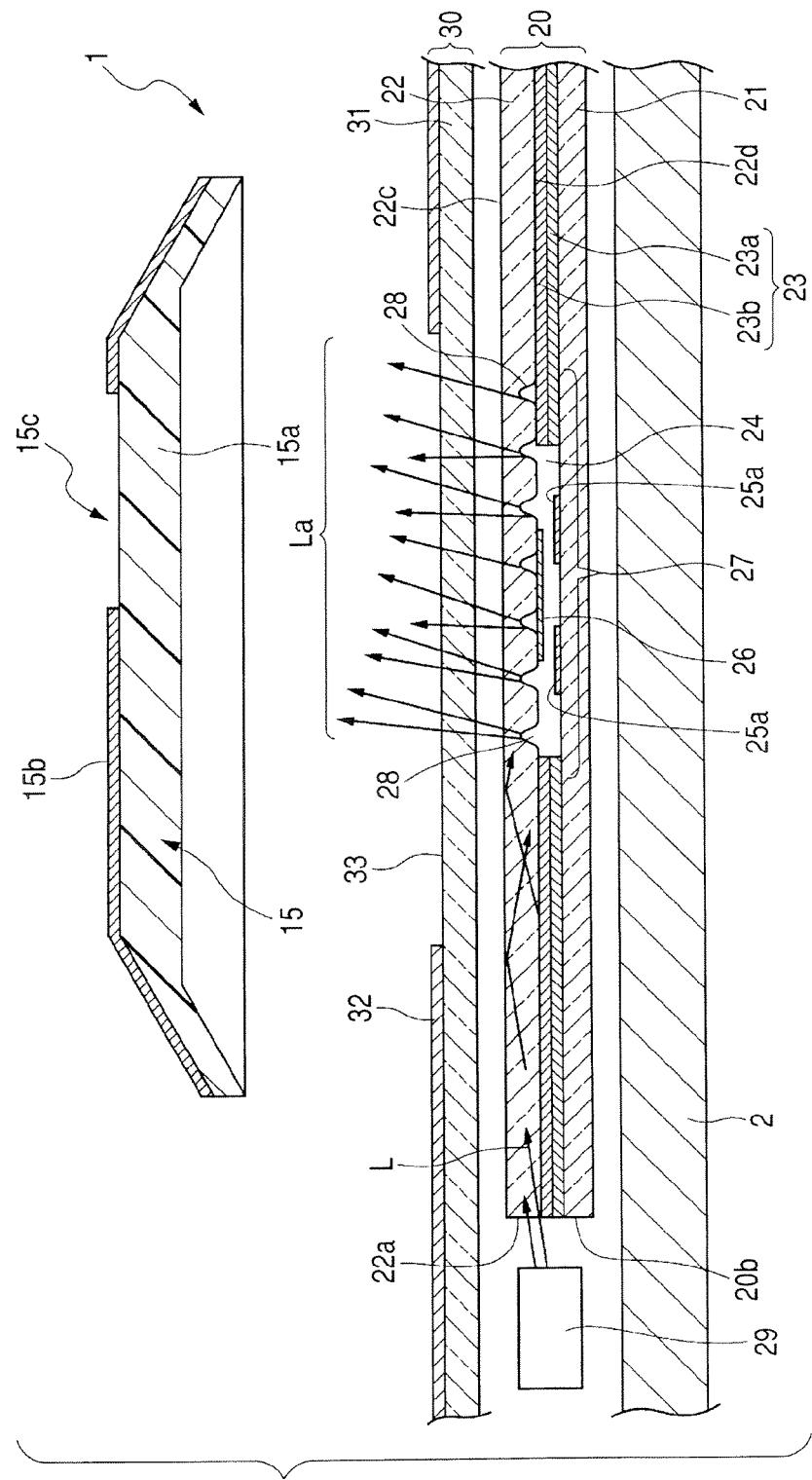
FIG. 4 is an enlarged view illustrating a structure of an illumination function portion.

As shown in an enlarged view in FIG. 4, the membrane lamination body 20 may be formed by laminating a substrate sheet 21, a pressing sheet 22, and a spacer layer 23 interposed between both sheets 21 and 22. A portion facing the pressing convex portion 18a of the elastic body 18 may be provided with a contact input portion 24 without the spacer layer 23. The contact input portion 24 may be formed in a position facing the pressing convex portion 18a of the elastic member 18 formed in each of the key input portions 10a, 10b, 10c, 10d, and 10e.

As shown in FIG. 4, in the contact input portion 24, a pair of lower contacts 25a and 25a may be formed in a surface of the substrate sheet 21, and an upper contact 26 may be formed in a lower surface of the pressing sheet 22 so as to face the lower contacts 25a and 25a. Each of the lower contacts 25a and 25a may be electrically connected to a conductive pattern wired in the surface of the substrate sheet 21. In the key input portions 10c, 10d, and the like, when the key top 15 is pressed, one end 16a of the first movable support member 16 may be rotated about an engagement portion engaging with the first support piece 11a and serving as a support point, and one end 17a of the second movable support member 17 may be rotated at the lower portion of the key top 15 so as to move down the key top 15. At this time, the elastic member 18 may be pressed down by the key top 15, and the pressing sheet 22 of the contact input portion 24 may be pressed through the pressing convex portion 18a and the mask sheet 30. The upper contact 26 contacts with the pair of lower contacts 25a and 25a so that the lower contacts 25a and 25a may be electrically connected to each other. In this manner, a key input signal may be obtained.

The spacer layer 23 interposed between the substrate sheet 21 and the pressing sheet 22 in a region excluding the contact input portion 24 may be an adhesive layer. The spacer layer 23 may include an organic resin layer 23a which may be formed on the surface of the substrate sheet 21 and may be formed of a resist material or the like and an adhesive layer 23b which is laminated thereon. The organic resin layer 23a may be formed in the surface of the substrate sheet 21 by means of a screen printing process or the like in a region excluding the contact input portion 24. The adhesive layer 23b may be formed in a surface of the organic resin layer 23a in a region excluding the contact input portion 24 by means of a screen printing process or the like, and the pressing sheet 22 may be fixed by the adhesive layer 23b.

Since the spacer layer 23 may be formed as the adhesive layer, the membrane lamination body 20 may be formed to be thin. In addition, since the spacer layer 23 may be formed as a lamination body of the organic resin layer 23a and the adhesive layer 23b, it is possible to maintain a wide gap between the substrate sheet 21 and the pressing sheet 22 in the vertical direction. Accordingly, in the contact input portion 24, it is possible to maintain a vertical gap between the lower contacts 25a and 25a and the upper contact 26.

In the keyboard device 1 shown in FIGS. 3 and 4, the pressing sheet 22 as the uppermost layer of the membrane lamination body 20 may serve as a light guiding sheet.

As shown in FIG. 4, a hole 20b may be opened to the membrane lamination body 20 so as to penetrate in the vertical direction. A light emitting diode device 29 as a light source may be fixed to a surface of the chassis 2 through a flexible interconnection substrate or the like, and the light emitting diode device 29 is inserted into the hole 20b. The light emitting diode device 29 may be formed by accommodating a bare tip of the light emitting diode in a transparent package, and may be capable of emitting light in all directions to the vicinity thereof. Since the light emitting diode device 29 faces an end surface 22a of the pressing sheet 22 as the light guiding sheet inside the hole 20b, the light emitted from the light emitting diode device 29 may be guided from the end surface 22a to the inside of the pressing sheet 22.

The thickness of the pressing sheet 22 may be less than 1 mm, and may be less than 500 µm. In this embodiment, the thickness of the pressing sheet 22 may be approximately 300 µm.

In the pressing sheet 22, a front surface 22c facing the key top 15 and a rear surface 22d facing the chassis 2 may be formed as a flat surface as a smooth mirror surface. In the pressing sheet 22, a reflection region 27 having a predetermined area may be separately set, and the reflection region 27 may be provided with plural concave portions 28.

Each concave portion 28 may be formed in such a manner that energy such as a $CO_2$ laser may be applied to an extremely small area of the rear surface 22d of the pressing sheet 22 so as to decompose and remove a part of a material forming the pressing sheet 22. For this reason, the pressing sheet 22 may be formed of a material which may be transparent and may be decomposed by energy of the laser. As a transparent film material which is thin and flexible, has comparatively high strength, and is decomposed by energy of the laser, for example, polycarbonate, urethane, silicon, or the like may be used.

Since the concave portion 28 may be formed in such a manner that energy of a minute spot laser may be applied to the rear surface 22d of the pressing sheet 22 so as to decompose and remove a part of the material forming the pressing sheet 22, a shape of an opening of the concave portion 28 when seen from the rear surface 22d may be a circular shape. The circular shape may be a round shape or an oval shape. In addition, an opening area of the concave portion 28 may become gradually small toward the bottom portion of the concave portion 28, and the entire inner surface of the concave portion 28 may be formed in a concave curve surface shape. Further, since the concave portion 28 may be formed by decomposing the material forming the pressing sheet, the inner surface of the concave portion 28 may be formed as a smooth surface, that is, a mirror surface throughout the entire area thereof. Herein, the smooth surface or the mirror surface may indicate that the surface roughness is substantially equal to the surface roughness of the front surface 22c and the rear surface 22d or the surface roughness is smaller than those of the front surface 22c and the rear surface 22d. Further, the smooth surface or the mirror surface may indicate such a characteristic that a diffused reflection of the light does not occur in the inner surface of the concave portion 28 and the light is reflected on the basis of the principle of the incident angle and the reflection angle inside the sheet in accordance with the angle of the inner surface when the light propagated through the inside the pressing sheet 22 contacts with the inner surface of the concave portion 28 from the inside of the sheet.

As shown in FIG. 4, light L emitted from the light emitting diode device 29 so as to be incident from the end surface 22a into the pressing sheet 22 may be propagated through the inside of the pressing sheet 22 by repeating the reflection in the front surface 22c and the reflection in the rear surface 22d. When the light propagated through the inside of the pressing sheet 22 contacts with the inner surface of the concave portion 28, the light may be reflected toward the inside of the pressing sheet 22 so that the incident angle and the reflection angle are substantially equal to each other with respect to an imaginary plane contacting with the inner surface of the concave portion 28 at the light contact position, and the light is directed to the front surface 22c. Then, the key top 15 may be illuminated by the light La emitted from the front surface 22c of the pressing sheet 22.

The membrane lamination body 20 may be formed in a wide area extending throughout the entire area of the keyboard device 1, and may include the reflection region 27 and the contact input portion 24 facing the lower portions of the key tops 15 of all the key input portions 10a, 10b, 10c, 10d, and 10e. For example, as shown in FIG. 2, the hole 20b, into which the light emitting diode device 29 is inserted, is formed at a position depicted by "i" between a third key input portion and a fourth key input portion from the bottom in FIG. 2. The hole 20b may be formed at a position between the adjacent key input portions and between the adjacent X-shaped links each including the first and second movable support members 16 and 17. The light emitting diode device 29 capable of emitting light in all directions in the vicinity thereof may be disposed inside the hole 20b.

For this reason, it may be possible to prevent the light emitting diode device 29 from being extremely distant from each reflection region 27 of all the key input portions, and thus to efficiently and uniformly apply the light of the light emitting diode device 29 to the reflection regions 27 formed in the key input portions 10a, 10b, 10c, 10d, and 10e.

Alternatively, the light emitting diode device 29 may be disposed at a position depicted by "ii" in FIG. 2, and the light emitted from the light emitting diode device 29 may be incident from the lower edge of the pressing sheet 22 in FIG. 2 to the inside of the pressing sheet 22. Alternatively, the light emitting diode device 29 may be disposed so as to face the left and right edges of the pressing sheet 22.

The mask sheet 30 may include a translucent and flexible base sheet 31 such as PET (polyethylene-terephthalate). Herein, the translucency may indicate such a characteristic that the light La emitted from the front surface 22c of the pressing sheet 22 may be propagated so as to illuminate the key top 15.

The mask sheet 30 may include a shielding portion 32 and a translucent portion 33. The shielding portion 32 may have a shielding film which may be formed on the surface of the base sheet 31 so as not to propagate the light therethrough. The shielding film may be a black or dark green layer, and may be formed by printing a resin layer on the surface of the base sheet 31 or by sputtering an inorganic layer such as a metal layer. The translucent portion 33 does not have a shielding film and hence can propagate light therethrough.

In FIG. 2, the shielding portion 32 of the mask sheet 30 may be depicted by hatching, and the translucent portion 33 may not be depicted by hatching. Each translucent portion 33 may be formed in a square shape.

Regarding the plan view shown in FIG. 2, the edge of the translucent portion 33 may be located on the inside of the edge of the key top 15 and an area of the translucent portion 33 may be smaller than that of the key top 15 so that the translucent portion 33 does not protrude from the edge of each key top 15 formed in all the key input portions 10a, 10b, 10c, 10d, and 10e. As a result, the shielding portion 32 may be located below a gap between the adjacent key tops 15.

As shown in FIG. 2, the hole 20b formed in the membrane lamination body 20 may be covered by the shielding portion 32 of the mask sheet 30, and the upper portion of the light emitting diode device 29 disposed inside the hole 20b may be covered by the shielding portion 32.

Accordingly, even when the light emitting diode device 29 is disposed below the gap between the adjacent key tops 15, the light emitted upward from the light emitting diode device 29 may be shielded by the shielding portion 32 so as to prevent the light from leaking from the gap between the adjacent key tops 15. In addition, it may be possible to prevent the light propagated through the inside of the pressing sheet 22 from leaking upward from the gap between the adjacent key tops 15. However, as shown in FIG. 4, since the reflection region 27 having the plural concave portions 28 is formed on the lower side of the translucent portion 33, the light La propagated through the inside of the pressing sheet 22 and reflected by the concave portion 28 of the reflection region 27 may be applied to the key top 15 through the translucent portion 33.

As shown in FIG. 4, a body portion 15a of the key top 15 may be formed of a semitransparent translucent material or a transparent material such as polycarbonate, and a surface of the body portion 15a may be provided with a coating layer 15b which may be formed by coating or nonelectrolytic plating so as not to allow light to pass therethrough. An illumination display portion 15c may be formed by removing a part of the coating layer 15b using a $CO_2$ laser or the like. In the keyboard device 1 shown in FIG. 1, the illumination display portion 15c formed on the surface of the key tops 15 may correspond to a display showing a character, a sign, or a number.

In FIG. 1, the reflection region 27 having the plural concave portions 28 is shown as a region depicted by the dashed line. The reflection region 27 may be located right below the illumination display portion 15c formed in each key top 15 so as to be formed in an area slightly wider than that of the illumination display portion 15c. That is, in the plan view shown in FIG. 1, the illumination display portion 15c formed in each key top 15 is formed in a range of the reflection region 27.

In the keyboard device 1 shown in FIGS. 1 to 4, the pressing sheet 22 as the uppermost layer of the membrane lamination body 20 may be used as the light guiding sheet. The light emitted from the light emitting diode device 29 may be propagated through the inside of the pressing sheet 22, may be reflected by the plural concave portions 28 formed in the reflection region 27, and then may be applied to the illumination display portion 15c of the key top 15 through the translucent portion 33 of the mask sheet 30. Since the translucent portion 33 of the mask sheet faces the upper portion of the pressing sheet 22 instead of disposing a metallic substrate or a resinous circuit board thereon, the light La reflected upward from the reflection region 27 may be efficiently applied to the illumination display portion 15c so as to clearly illuminate the illumination display portions 15c of all the key tops 15.

In addition, since the substrate sheet 21, the lower contacts 25a and 25a, or the upper contact 26 can be formed of a non-translucent material, it may be possible to reduce a cost of a material forming the constituent.

As shown in FIG. 2, since the hole 20b formed in the membrane lamination body 20 may be disposed between the key input portions and the light emitting diode device 29 is disposed inside the hole 20b, it may be possible to prevent the light emitting diode device 29 from being excessively distant from the reflection region 27 formed in each key input portion. Accordingly, it may be possible to reduce the luminance defect of the illumination display portions 15c of the key tops 15 located in all the key input portions.

As shown in FIG. 3, the first and second movable support members 16 and 17 and the elastic body 18 may be interposed in the light path in which the light La reflected by the concave portion 28 of the reflection region 27 is directed to the illumination display portion 15c. Accordingly, the first and second movable support member 16 and 17 and the elastic body 18 may be formed of a transparent or semitransparent translucent material. Also, the first and second movable support members 16 and 17 and the elastic member 18 may be formed of a white synthetic resin material or the like so as to reflect or diffuse the light from the surfaces thereof. In this case, the light reflected by the reflection region 27 may be reflected or diffused by the first and second movable support members 16 and 17 or the elastic member 18, and may be applied to the key top 15.

Figure 6A:
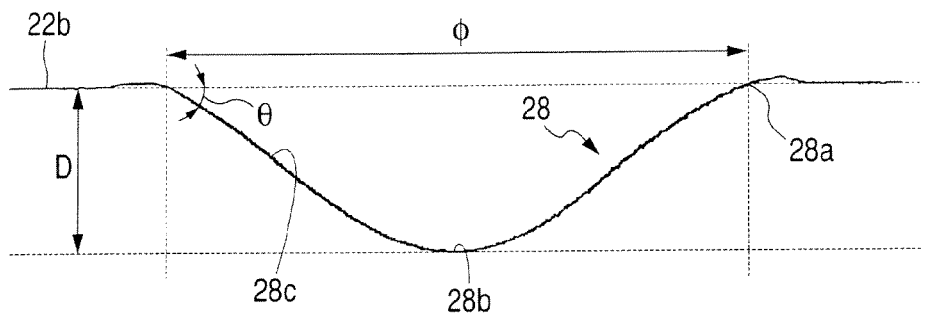
FIGS. 6A, 6B, and 6C are diagrammatic views showing an actual measurement value of a shape of a concave portion formed in a light guiding sheet.
Figure 6B:
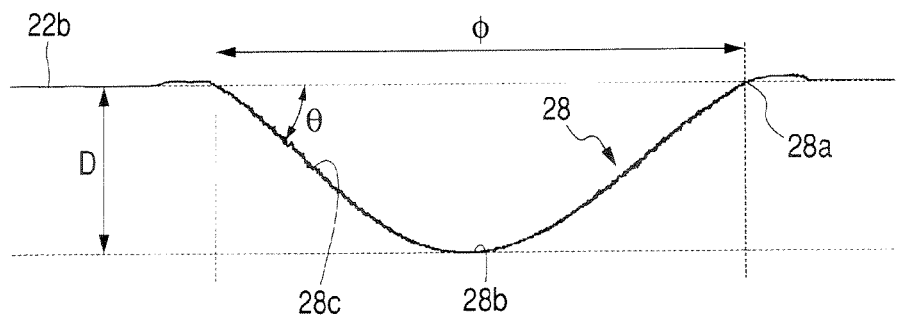
Figure 6C:
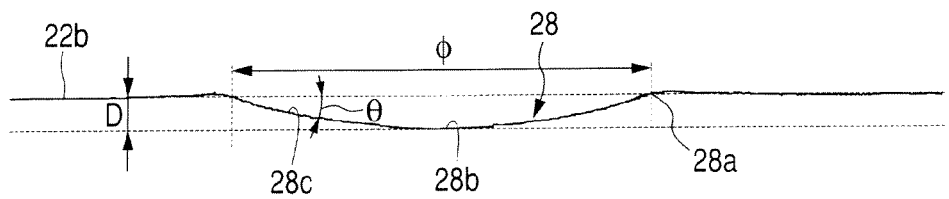

FIGS. 6A, 6B, and 6C show actual results obtained by measuring the surface shape of the concave portion 28 using a laser microscope, where the concave portion 28 is actually formed by irradiating a $CO_2$ laser to the rear surface 22d of the pressing sheet 22 formed of polycarbonate. FIGS. 6A, 6B, and 6C are diagrammatic views showing the sectional shape in a surface perpendicular to the rear surface 22d based on the center of the concave portion 28.

As shown in FIGS. 6A, 6B, and 6C, when the energy of the irradiation period of the $CO_2$ laser applied to the rear surface 22d is changed, it is possible to freely set an opening area $\phi$ of the opening 28a of the concave portion 28 or a depth D from the rear surface 22d to a bottom portion 28b of the concave portion 28. The period during which the $CO_2$ laser is applied is the longest in FIG. 6A. The period during which the $CO_2$ laser is applied is the shortest in FIG. 6C. The period during which the $CO_2$ laser is applied falls in the range thereof in FIG. 6B. Accordingly, the opening area $\phi$ of the opening 28a is the largest in FIG. 6A and is the smallest in FIG. 6C. In addition, the depth D is the deepest in FIG. 6A and is the shallowest in FIG. 6C.

From the diagrammatic views shown in FIGS. 6A, 6B, and 6C, it is understood that the inner surface 28c of the concave portion 28 is a concave curve surface smoothly continuous from the opening 28a to the bottom portion 28b and the bottom portion 28b is a smooth concave curve surface. An inclined angle $\theta$ of the inner surface 28c of the concave portion 28 with respect to the rear surface 22d is the largest in FIG. 6A and is the smallest in FIG. 6C.

A hole diameter of the opening 28a of the concave portion 28 is not more than approximately 500 µm, and may not be more than approximately 300 µm. The depth D of the concave portion 28 is not less than approximately 5 µm, and may not be more than approximately ⅓ of a plate thickness of the pressing sheet 22.

As shown in FIG. 4, when the light L propagated through the inside of the pressing sheet 22 is located at the inner surface 28c of the concave portion 28 inside the sheet, the light is mainly reflected toward the front surface 22c. As shown in FIG. 6A, as the depth D of the concave portion 28 is large and the inclined angle $\theta$ of the inner surface 28c is large, it may be possible to increase an ability of directing the light upward in the perpendicular direction. In addition, as the depth D of the concave portion 28 is large and the inclined angle $\theta$ of the inner surface 28c is large, it may be possible to increase the sum of the intensity of the light reflected by the inner surface 28c of one concave portion 28.

Accordingly, when the opening area or the depth D of the concave portion 28 inside the same pressing sheet 22 is differently set in accordance with the distance from the reflection region 27 to the light emitting diode device 29 as the light source, the width of the reflection region 27, or the size of the illumination display portion 15c, it is possible to reduce a difference between the reflected light intensities due to a difference in the distance from the light emitting diode device 29 to the reflection region 27.

In the arrangement of the concave portions 28, the depth D of the concave portion 28 formed in the reflection region 27 distant from the light emitting diode device 29 is set to be larger than that of the reflection region 27 adjacent to the light emitting diode device 29. As a result, the angle $\theta$ may be set to be large. In addition, even in the same reflection region 27, the depth D and the angle $\theta$ may become gradually large in a direction moving away from the light emitting diode device 29.

In addition, the arrangement density of the concave portions 28 formed in the reflection region 27 distant from the light emitting diode device 29 may be set to be higher than that of the reflection region 27 adjacent to the light emitting diode device 29. Further, even in the same reflection region 27, the arrangement density may be set to be high in a direction moving away from the light emitting diode device 29.

Furthermore, when the concave portions having different depths D and opening areas $\phi$ exist in the same reflection region 27, it may be possible to focus the light to the illumination display portion 15c or to apply light having light intensity in accordance with the size or the like of the character of the illumination display portion 15c to the illumination display portion 15c.

Since the concave portion 28 may be formed by irradiating a laser to the rear surface 22d of the pressing sheet 22, it may be possible to freely design and arrange plural types of concave portions 28 in the same pressing sheet 22 by changing the laser irradiation period or the irradiation energy.

Figure 5:
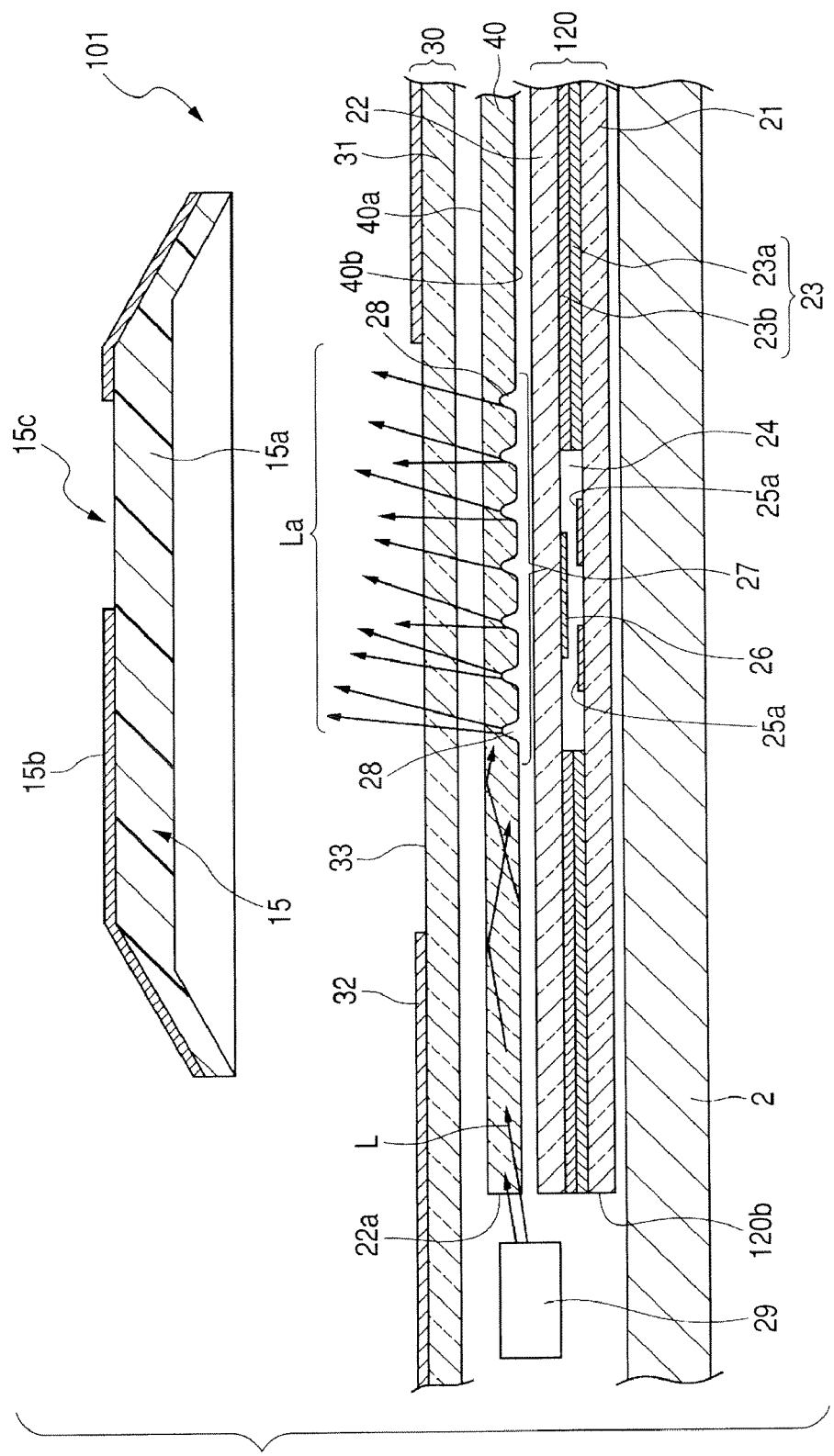
FIG. 5 is an enlarged view illustrating a structure of the illumination function portion according to an embodiment of the disclosure.

FIG. 5 is a sectional view showing a keyboard device 101 according to various embodiments of the invention and corresponding to the sectional view in FIG. 4.

In the keyboard device 101 shown in FIG. 5, the same reference numerals are given to the same constituents as those of the keyboard device 1 according to the first embodiment.

In the keyboard device 101 shown in FIG. 5, a membrane lamination body 120 may include the substrate sheet 21, the pressing sheet 22, and the spacer layer 23, where the contact input portion 24 may be formed in a portion without the spacer layer 23. However, the concave portions 28 may not be formed in the pressing sheet 22, and the pressing sheet 22 may be formed of a PET sheet of which both surfaces are smooth.

A coating sheet 40 may be formed between the pressing sheet 22 of the membrane lamination body 120 and the base sheet 31 of the mask sheet 30, and the coating sheet 40 may be adhered to the pressing sheet 22 and the base sheet 31. In addition, the coating sheet 40 may serve as a light guiding sheet.

The coating sheet 40 may be formed of a material such as polycarbonate which is easily decomposed by a laser. In addition, plural concave portions 28 may be formed in a rear surface 40b of the coating sheet 40 so as to face the reflection region 27. The concave portions 28 may be formed by decomposing a part of the material, forming the coating sheet, using a laser. As shown in FIG. 6, the inner surface 28c of the concave portion 28 may be smooth. The surface roughness of the inner surface 28c may be equal to the surface roughness of the front surface 40a and the rear surface 40b of the coating sheet 40 or the surface roughness thereof may be smaller than those of the front surface 40a and the rear surface 40b.

As shown in FIG. 5, a hole 120b may be formed in the membrane lamination body 120, a hole 41 may be formed in the coating sheet 40, and then the light emitting diode device 29 may be located inside the holes 120b and 41. In addition, the light emitting diode device 29 may be covered by the shielding portion 32 of the mask sheet 30.

In these embodiments, since the coating sheet 40 as the light guiding sheet may be laminated on the membrane lamination body 120, the membrane lamination body 120 may be formed of a non-transparent material.

Figure 7:
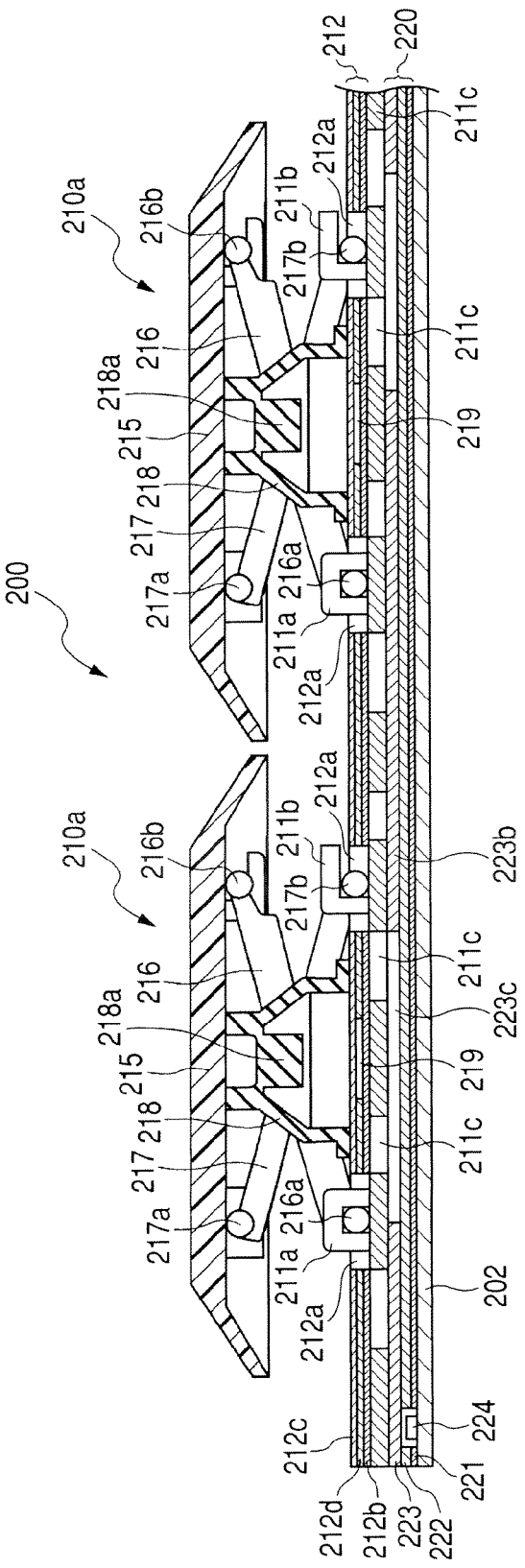
FIG. 7 is a sectional view showing the input device according to an embodiment of the disclosure.
Figure 8:
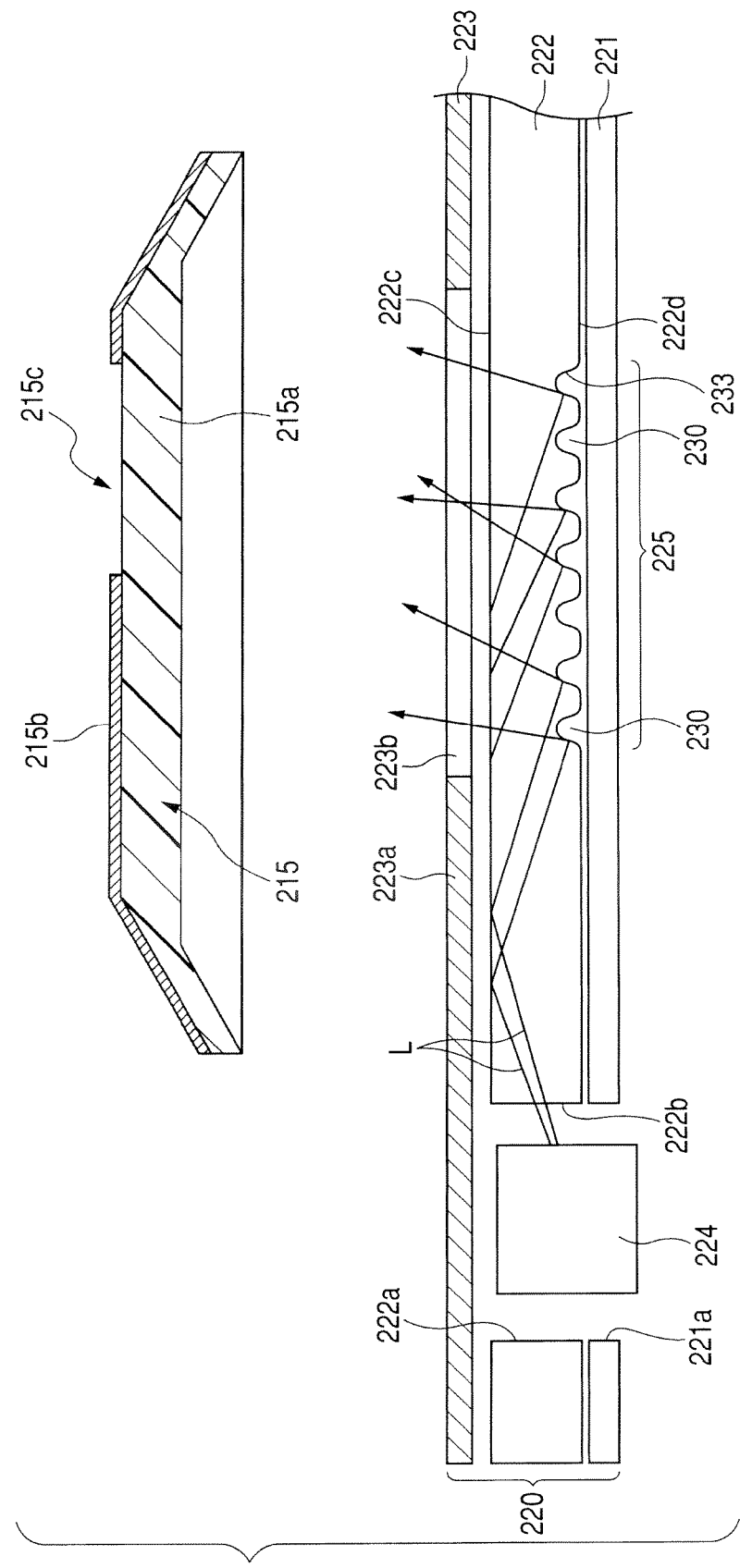
FIG. 8 is an enlarged view showing a structure of the illumination function portion in FIG. 7.

FIG. 7 is an enlarged view showing a section of the input device according to an exemplary embodiment. FIG. 8 is an enlarged view showing a structure of an illumination function portion.

As shown in FIG. 7, in an input device 200, an illumination function portion 220 may be formed on a chassis 202, a support plate 211 formed as a metal plate such as aluminum may be formed on the illumination function portion 220, and a membrane lamination body 212 may be formed on the support plate 211. In portions provided with manipulation portions 210a, first and second support pieces 211a and 211b of the support plate 211 are bent upward. In the portions provided with the manipulation portions 210a, a pair of the first support pieces 211a may be formed so as to be distant from each other in a direction perpendicular to a paper sheet of FIG. 7, and a pair of the second support pieces 211b may be formed so as to be distant from each other in a direction perpendicular to the paper sheet. A hole 212a may be opened to the membrane lamination body 212, and the first and second support pieces 211a and 211b may protrude upward from the membrane body 212 through the hole 212a.

Each manipulation portion 210a may be provided with a key top 215, and first and second movable support members 216 and 217 may be formed between the key top 215 and the support plate 211. In the first movable support member 216, one end 216a may be supported to the first support piece 211a so as to be rotatable, and the other end 216b may be supported to the lower portion of the key top 215 so as to be rotatable and slidable in the transverse direction. In the second movable support member 217, one end 217a may be supported to the lower portion of the key top 215 so as to be rotatable, and the other end 217b may be supported to the second support piece 211b so as to be rotatable and slidable in the transverse direction. The center portions of the first movable support member 216 and the second movable support member 217 may be connected to each other so as to be rotatable, and hence the first movable support member 216 and the second movable support member 217 may constitute an X-shaped support link.

An elastic member 218 may be formed between the membrane lamination body 212 and the key top 215. The elastic member 218 may be formed of synthetic rubber, and may be an urging member which may apply upward urging force to the key top 215 in a direction moving away from the membrane lamination body 212. The inside of the lower portion of the elastic member 218 may be a cavity, and a downward pressing convex portion 218a may be integrally formed with the cavity.

The membrane lamination body 212 may be formed by laminating a lower flexible sheet 212b, an upper flexible sheet 212c, and a spacer sheet 212d interposed between both flexible sheets 212b and 212c. In a portion facing the pressing convex portion 218a of the elastic member 218, a hole may be formed in the spacer sheet 212d, and an input function portion 219 may be formed at the portion. In the input function portion 219, a front surface of the lower flexible sheet 212b and a rear surface of the upper flexible sheet 212c may be respectively provided with contact electrodes which face each other. In addition, the front surface of the lower flexible sheet 212b and the rear surface of the upper flexible sheet 212c may be provided with a lead pattern of a conductive layer electrically connected to the contact electrodes formed in the input function portions 219.

In the manipulation portion 210a, when the key top 215 is pressed, one end 216a of the first movable support member 216 may be rotated about an engagement portion engaging with the first support piece 211a, and one end 217a of the second movable support member 217 may be rotated at the lower portion of the key top 215 so as to move down the key top 215. At this time, the elastic member 218 may be pressed down by the key top 215, and the pressing convex portion 218a and the input function portion 219 may be pressed so that the contacts of the input function portion 219 contact with each other. In this manner, a key input signal may be obtained.

The illumination function portion 220 may include a reflection sheet 221 which may be formed on the chassis 202, a light guiding sheet 222 which may be formed thereon, and a mark sheet 223 which may be laminated thereon. As shown in FIG. 8, a hole 221a may be opened to an end of the reflection sheet 221, and a hole 222a may be opened to an end of the light guiding sheet 222. A flexible interconnection substrate may be adhered onto the chassis 202, and a light emitting diode device 224 mounted to the flexible interconnection substrate may be inserted into the holes 221a and 222a so as to serve as a light source which applies light to the inside of the light guiding sheet 222.

The light emitting diode device 224 may be formed by accommodating a bare tip of the light emitting diode in a transparent package. Since the light emitting diode device 224 faces an end surface 222b of the light guiding sheet 222 inside the hole 222a, the light emitted from the light emitting diode device 224 is guided from the end surface 222b to the inside of the light guiding sheet 222.

In FIG. 8, the light guiding sheet 222 may be depicted to have a comparatively thick dimension, but in fact, the thickness of the light guiding sheet 222 may be less than approximately mm, and may be less than approximately 500 μm. In this embodiment, the thickness of the light guiding sheet 222 is approximately 300 μm.

The light guiding sheet 222 may be formed as a flat surface of a mirror surface so that a front surface 222c facing the manipulation portion 210a and a rear surface 222d facing the chassis 202 may be smooth. In the light guiding sheet 222, a reflection region 225 having a predetermined area may be separately set, and the reflection region 225 may be provided with plural concave portions 230.

Each concave portion 230 may be formed in such a manner that energy such as a $CO_2$ laser may be applied to an extremely small area of the rear surface 222d of the light guiding sheet 222 so as to decompose and remove a part of a material forming the light guiding sheet 222. For this reason, the light guiding sheet 222 may be formed of a material which may be transparent and may be decomposed by energy of the laser. As a transparent material which may be thin, has comparatively high strength, and may be decomposed by energy of the laser, for example, polycarbonate, urethane, silicon, or the like may be used.

Since the concave portion 230 may be formed in such a manner that energy of a minute spot laser may be applied to the rear surface 222d of the light guiding sheet 222 so as to decompose and remove a part of the material forming the light guiding sheet 222, a shape of an opening of the concave portion 230 when seen from the rear surface 222d may be a circular shape. In addition, the opening diameter becomes gradually small in a direction toward the bottom portion of the concave portion 230, the bottom portion may be formed in a concave spherical surface shape, and then the entire inner surface of the concave portion 230 may be formed in a concave curve surface shape. Further, since the concave portion 230 may be formed by decomposing the material forming the light guiding sheet, the inner surface of the concave portion 230 may be formed as a smooth surface, that is, a mirror surface throughout the entire area thereof. Herein, the smooth surface or the mirror surface indicates that the surface roughness may be equal to the surface roughness of the front surface 222c and the rear surface 222d. Further, the smooth surface or the mirror surface may indicate such a characteristic that a diffused reflection of the light may not occur in the inner surface of the concave portion 230 and the light is reflected on the basis of the principle of the incident angle and the reflection angle inside the sheet in accordance with the angle of the inner surface when the light propagated through the inside the light guiding sheet 222 contacts with the inner surface thereof. In addition, the shape and the formation method of the concave portion 230 may be the same as those of the above-described embodiments.

As shown in FIG. 8, light L emitted from the light emitting diode device 224 so as to be incident from the end surface 222b into the light guiding sheet 222 may be propagated through the inside of the light guiding sheet 222 by repeating the reflection in the front surface 222c and the reflection in the rear surface 222d. When the light propagated through the inside of the light guiding sheet 222 contacts with the inner surface of the concave portion 230, the light may be reflected toward the inside of the light guiding sheet 222 so that the incident angle and the reflection angle are substantially equal to each other with respect to an imaginary plane contacting with the inner surface of the concave portion 230 at the light contact position, and the light is directed to the front surface 222c. Then, the manipulation portion 210a may be illuminated by the light emitted from the front surface 222c of the light guiding sheet 222.

As shown in FIG. 8, a body portion 215a of the key top 215 may be formed of a semitransparent translucent material or a transparent material such as polycarbonate, and a surface of the body portion 215a may be provided with a coating layer 215b which may be formed by coating or nonelectrolytic plating so as not to allow light to pass therethrough. An illumination display portion 215c may be formed by removing a part of the coating layer 215b using a $CO_2$ laser or the like.

As shown in FIG. 8, the mask sheet 223 laminated on the light guiding sheet 222 may include a light shielding portion 223a and a light transmitting portion 223b. The light shielding portion 223a may be formed by painting a surface of a transparent sheet in black or is formed of a non-transparent sheet. The light transmitting portion 223b may be formed in an opening or a transparent portion of the sheet. The light transmitting portion 223b may be located right above the reflection region 225, and may be formed to have the same area as that of the reflection region 225 or an area slightly wider than that of the reflection region 225. A portion excluding the upper region of the reflection region 225 may be covered by the light shielding portion 223a, and the light shielding portion 223a may exist below a gap between the adjacent key tops 215.

As shown in FIG. 8, the reflection sheet 221 may be disposed below the light guiding sheet 222. The surface of the reflection sheet 221 may be a reflection surface having a metallic color or a white color, and is capable of reflecting the light leaking downward from the rear surface 222d of the light guiding sheet 222 toward the inside of the light guiding sheet 222. In addition, the inner surface of the concave portion 230 may be a mirror surface. In the light propagated through the inside of the light guiding sheet 222 and located at the inner surface of the concave portion 230, most of the light components may be reflected in the inside of the light guiding sheet 222 due to a difference in refractive index between the light guiding sheet 22 and air, the reflection sheet 221 may not be particularly provided.

As shown in FIG. 7, the metallic support plate 211 may exist on the illumination function portion 220. However, in the support plate 211, an opening 211c may be formed on at least the reflection region 225 so that the support plate 211 does not disturb the transmission of the light.

In addition, the membrane lamination body 212 and the first and second movable support members 216 and 217 and the elastic member 218 may be formed of a transparent material or a semitransparent material which may allow the light to pass therethrough. Accordingly, the light emitted upward by the concave portion 230 of the reflection region 225 may be applied to the key top 215 through the membrane lamination body 212, the first and second movable support members 216 and 217, and the elastic member 218.

Alternatively, the first and second movable support members 216 and 217, the elastic member 218, and the like may be formed of a white synthetic resin material so that the light is reflected and diffused by the surfaces thereof, and the light passing through the membrane body 212 may be reflected or diffused so as to be applied to the key top 215.

As shown in FIG. 8, when the light propagated through the inside of the light guiding sheet 222 contact with the inner surface 233 of the concave portion 230 inside the sheet, the light may be mainly reflected toward the front surface 222c. However, since the concave portion 230 may be formed in the same shape as that of the concave portion 230 as shown in FIGS. 6A, 6B, and 6C, as the dimension D of the concave portion 230 may be large and the inclined angle θ of the inner surface may be large, it may be possible to increase an ability of directing the light upward in the perpendicular direction. In addition, as the depth D of the concave portion 230 may be large and the inclined angle θ of the inner surface is large, it may be possible to increase the sum of the intensity of the light reflected by the inner surface among the light propagated through the inside of the light guiding sheet 222.

Accordingly, when the opening area φ or the depth D of the concave portion 230 inside the same light guiding sheet 222 is differently set in accordance with the distance from the reflection region 225 to the light emitting diode device 224 as the light source, the width of the reflection region 225, or the size of the illumination display portion 215c, it may be possible to easily reduce a difference between the light intensities due to a difference in the distance from the light emitting diode device 224 to the reflection region 225. In addition, since it may be possible to increase the directivity when reflecting the light toward the illumination display portion 215c using the concave portion 230, for example, even when the mask sheet 223 does not exist, it may be possible to reduce an amount of the light leaking upward from the gap between the adjacent key tops 215.

In the arrangement of the concave portions 230, the depth D of the concave portion 230 formed in the reflection region 225 distant from the light emitting diode device 224 may be set to be larger than that of the reflection region 225 adjacent to the light emitting diode device 224. As a result, that the angle θ may be set to be large. In addition, even in the same reflection region 225, the depth D and the angle θ may become gradually large in a direction moving away from the light emitting diode device 224.

In addition, the arrangement density of the concave portions 230 formed in the reflection region 225 distant from the light emitting diode device 224 may be set to be higher than that of the reflection region 225 adjacent to the light emitting diode device 224. Further, even in the same reflection region 225, the arrangement density may be set to be high in a direction moving away from the light emitting diode device 224.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
a plurality of manipulation portions;
an input function portion which is manipulated by the manipulation portions to perform an input function;
a light guiding sheet which faces the rear side of the plurality of manipulation portions; and
a light source which applies light to the inside of the light guiding sheet,
wherein a rear surface opposite to a front surface of the light guiding sheet facing the manipulation portions is provided with a plurality of concave portions which is depressed to the inside of the light guiding sheet,
wherein each concave portion has a circular opening and an inner surface which is a smooth concave curve surface, and
wherein light propagated through the inside of the light guiding sheet is reflected by the inner surface toward the inside of the light guiding sheet, and the light is applied from the front surface of the light guiding sheet to the manipulation portions.

2. The input device according to claim 1,
wherein a depth of the concave portion and an inclined angle of the inner surface with respect to the rear surface are different depending on a location of the light guiding sheet.

3. The input device according to claim 2,
wherein the depth and the angle increase in a direction away from the light source.

4. The input device according to claim 2,
wherein the concave portions having different depths and angles exist in a region where light is applied to the same manipulation portion.

5. The input device according to claim 1,
wherein a diameter of the opening of the concave portion is different depending on a location of the light guiding sheet.

6. The input device according to claim 1,
wherein an arrangement density of the plurality of concave portions is different depending on a location of the light guiding sheet.

7. The input device according to claim 6,
wherein the arrangement density of the concave portions facing the manipulation portion distant from the light source is higher than that of the concave portions facing the manipulation portion adjacent to the light source.

8. The input device according to claim 1,
wherein the manipulation portions are arranged with a gap interposed therebetween, and the concave portions are formed in regions overlapping with the manipulation portions.

9. The input device according to claim 1,
wherein the concave portion formed in the light guiding sheet is formed by decomposing a part of a material, forming the light guiding sheet, using energy of a laser.

10. A keyboard device comprising:
a chassis;
a plurality of key tops; and
support members which are formed on the chassis and support the plurality of key tops so as to be movable in the vertical direction,
wherein a lower contact, a flexible pressing sheet covering the lower contact, and a contact input portion formed on a lower surface of the pressing sheet and having an upper contact facing the lower contact are disposed between the chassis and each key top,
wherein a plurality of the contact input portions is disposed at positions pressed by the key tops,
wherein the pressing sheet or a coating sheet laminated on the pressing sheet is a light guiding sheet which propagates light therein,
wherein a light source is disposed on the chassis so as to apply light to the inside of the light guiding sheet,
wherein a rear surface opposite to a front surface of the light guiding sheet facing the key tops is provided with a plurality of concave portions, and
wherein light propagated through the inside of the light guiding sheet is reflected by the concave portions toward the key tops.

11. The keyboard device according to claim 10,
wherein the lower contact is formed on a front surface of a substrate sheet,
wherein the substrate sheet is fixed to the pressing sheet with an adhesive layer interposed therebetween except for a region where the lower contact faces the upper contact, and
wherein the adhesive layer is formed to have a thickness which allows the lower and upper contacts to face each other with a gap interposed therebetween.

12. The keyboard device according to claim 10,
wherein each concave portion has a circular, oval, or elliptical opening and an inner surface which is a smooth concave curve surface.

13. The keyboard device according to claim 12,
wherein a depth of the concave portion and an inclined angle of the inner surface with respect to the rear surface of the light guiding sheet are different depending on a location of the light guiding sheet.

14. The keyboard device according to claim 13,
wherein the depth and the angle increase in a direction away from the light source.

15. The keyboard device according to claim 13,
wherein the concave portions having different depths and angles exist in a region where light is applied to the same key top.

16. The keyboard device according to claim 12,
wherein an area of the opening of the concave portion is different depending on a location of the light guiding sheet.

17. The keyboard device according to claim 12,
wherein an arrangement density of the plurality of concave portions is different depending on a location of the light guiding sheet.

18. The keyboard device according to claim 17,
wherein the arrangement density of the concave portions facing the key top distant from the light source is higher than that of the concave portions facing the key top adjacent to the light source.

19. The keyboard device according to claim 12,
wherein the concave portion formed in the light guiding sheet is formed by decomposing a part of a material, forming the light guiding sheet, using energy of a laser.

20. The keyboard device according to claim 10,
wherein the light source is disposed between the adjacent support members supporting the key tops, and the light guiding sheet is provided with a hole for allowing the light source to be inserted therein.

21. A keyboard device comprising:
a chassis;
a plurality of key tops;
support members which are formed on the chassis and support the plurality of key tops so as to be movable in the vertical direction;
contact input portions which receive pressing force from the key tops so that facing contacts contact with each other;
a light source;
a light guiding sheet which applies light emitted from the light source to the plurality of key tops; and
a mask member which is formed above the chassis and below the plurality of key tops so as to cover a gap between the adjacent key tops from the chassis,
wherein the mask member includes a shielding portion in which a shielding film is formed on a flexible and translucent base sheet and a translucent portion in which the shielding film is not formed,
wherein the shielding portion is disposed at a position covering the gap between the adjacent key tops from the downside of the gap,
wherein the contact input portions are covered by the base sheet, and the pressing force of one or more of the plurality of key tops is applied to the contact input portions through the base sheet, and
wherein the translucent portion of the mask member is formed at a position facing the lower side of each of the plurality of key tops, and an edge of the translucent portion is located on the inside of an edge of each key top.

22. The keyboard device according to claim 21,
wherein the light guiding sheet is disposed above the chassis and below the mask member, and
wherein a portion of the light guiding sheet facing the translucent portion is provided with a reflection region which reflects light toward the plurality of key tops.

23. The keyboard device according to claim 22,
wherein in the reflection region, a rear surface of the light guiding sheet facing the chassis is provided with a plurality of concave portions, and
wherein light propagated through the inside of the light guiding sheet is reflected by inner surfaces of the concave portions so as to be applied to the plurality of key tops through the translucent portion.

24. The keyboard device according to claim 23,
wherein the concave portions formed in the light guiding sheet are formed by decomposing a part of a material, forming the light guiding sheet, using energy of a laser.

* * * * *